US012336033B2

United States Patent
Li et al.

(10) Patent No.: US 12,336,033 B2
(45) Date of Patent: Jun. 17, 2025

(54) DEVICE CONTROL METHOD, COMPUTER-READABLE STORAGE MEDIUM, AND ELECTRONIC DEVICE FOR DUAL Wi-Fi

(71) Applicant: GUANGDONG OPPO MOBILE TELECOMMUNICATIONS CORP., LTD., Dongguan (CN)

(72) Inventors: Xiong Li, Dongguan (CN); Junyuan Huang, Dongguan (CN); Yuan Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 361 days.

(21) Appl. No.: 17/855,308

(22) Filed: Jun. 30, 2022

(65) Prior Publication Data

US 2022/0338289 A1    Oct. 20, 2022

Related U.S. Application Data

(63) Continuation of application No. PCT/CN2020/138684, filed on Dec. 23, 2020.

(30) Foreign Application Priority Data

Dec. 30, 2019   (CN) .......................... 201911396274.6

(51) Int. Cl.
*H04W 76/15* (2018.01)
*G01S 5/00* (2006.01)
(Continued)

(52) U.S. Cl.
CPC ........... *H04W 76/15* (2018.02); *G01S 5/0036* (2013.01); *H04B 17/318* (2015.01); *H04W 48/20* (2013.01)

(58) Field of Classification Search
CPC ..... H04W 88/06; H04W 48/20; H04W 48/16; H04W 28/0925; H04W 52/365
(Continued)

(56) References Cited

U.S. PATENT DOCUMENTS 7,251,459 B2 * 7/2007 McFarland .......... H03H 7/0153
455/132
7,865,150 B2 * 1/2011 McFarland .......... H04W 88/06
455/103

(Continued)

FOREIGN PATENT DOCUMENTS

CN   102256336 A   11/2011
CN   102404725 A   4/2012
(Continued)

OTHER PUBLICATIONS

International Search Report and Written Opinion dated Mar. 12, 2021 in International Application No. PCT/CN2020/138684. English translation attached.

(Continued)

*Primary Examiner* — William D Cumming
(74) *Attorney, Agent, or Firm* — Sheppard, Mullin, Richter & Hampton LLP

(57) ABSTRACT

Provided are a device control method, a non-transitory computer-readable storage medium and an electronic device. In the method, when the electronic device is connected to a first Wi-Fi network using a first Wi-Fi module, an operating frequency and corresponding frequency band type associated with every accessible access point for a second Wi-Fi network are acquired. When the accessible access points for the second Wi-Fi network have different frequency band types, a distance between each accessible access point for the second Wi-Fi network and the electronic device is acquired, and a target access point is determined according to each distance and the operating frequency of
(Continued)

each accessible access point. The electronic device is also connected to the target access point using the second Wi-Fi module while the electronic device is connected to the first Wi-Fi network.

20 Claims, 5 Drawing Sheets

(51) Int. Cl.
  *H04B 17/318* (2015.01)
  *H04W 48/20* (2009.01)
(58) Field of Classification Search
  USPC ...... 455/103, 127.1, 132, 517; 370/252, 276
  See application file for complete search history.

(56) References Cited

U.S. PATENT DOCUMENTS

| | | | |
|---|---|---|---|
| 9,300,418 B2* | 3/2016 | Van Dijk | G01S 5/0036 |
| 9,474,016 B2* | 10/2016 | Mindru | H04W 48/16 |
| 11,812,304 B2* | 11/2023 | Huang | H04W 28/0925 |
| 2003/0207668 A1* | 11/2003 | McFarland | H03H 7/48 |
| | | | 370/276 |
| 2007/0280185 A1* | 12/2007 | McFarland | H04W 88/06 |
| | | | 455/127.1 |
| 2013/0316753 A1* | 11/2013 | Van Dijk | H04H 60/51 |
| | | | 455/517 |
| 2015/0312851 A1* | 10/2015 | Ode | H04W 48/20 |
| | | | 370/252 |
| 2021/0377803 A1* | 12/2021 | Huang | H04W 28/0925 |
| 2023/0344115 A1* | 10/2023 | Liao | H01Q 5/42 |
| 2024/0136725 A1* | 4/2024 | Liu | H01Q 1/246 |
| 2024/0145910 A1* | 5/2024 | Zhang | H01Q 1/523 |
| 2024/0235040 A9* | 7/2024 | Liu | H01Q 15/14 |
| 2024/0259959 A1* | 8/2024 | Yi | H04W 52/365 |
| 2024/0288833 A1* | 8/2024 | Yang | G04R 60/06 |
| 2025/0007553 A1* | 1/2025 | Shen | H04B 1/0475 |
| 2025/0030896 A1* | 1/2025 | Jiang | G05D 1/2232 |

FOREIGN PATENT DOCUMENTS

| | | | | |
|---|---|---|---|---|
| CN | 103731881 | A | 4/2014 | |
| CN | 105101330 | A | 11/2015 | |
| CN | 106332238 | B | 8/2017 | |
| CN | 107635263 | A | 1/2018 | |
| CN | 107770841 | A | 3/2018 | |
| CN | 108012291 | A | 5/2018 | |
| CN | 108668378 | A | 10/2018 | |
| CN | 108770068 | A | 11/2018 | |
| CN | 109803325 | A * | 5/2019 | ........... H04W 28/08 |
| CN | 111148182 | A | 5/2020 | |
| CN | 112013859 | A * | 12/2020 | |
| EP | 3920583 | A1 | 12/2021 | |
| WO | 2015096038 | A1 | 7/2015 | |
| WO | 2019144383 | A1 | 8/2019 | |

OTHER PUBLICATIONS

First Office Action from corresponding Chinese Application No. 201911396274.6, dated Jan. 27, 2021. English translation attached.
The Second Office Action from corresponding Chinese Application No. 201911396274.6, dated Aug. 3, 2021. English translation attached.
The Grant Notice from corresponding Chinese Application No. 201911396274.6, dated Jan. 10, 2022. English translation attached.
Supplementary Search from corresponding Chinese Application No. 201911396274.6, dated Jul. 6, 2021.
Extended European Search Report dated Dec. 6, 2022 received in European Patent Application No. EP20910204.5.
JL Robert Etal:"High rejection filtersfor 5 GHz concurrent dual-radio WiFi", Microwave Conference Proceedings (APMC) ,2012 ASIA—PACIFIC,IEEE ,Dec. 4, 2012(Dec. 4, 2012) ,pp. 232-234, XP032316085.
Ming-Ju Ho et al:"IEEE802.11g OFDM WLAN throughput performance" , Vehicular Technology Conference ,2003. VTC2003-FALL. 2003 IEEE 58th Orlando ,FL, USA Oct. 6-9, 2003;[ IEEE Vehicular Technolgyconference] , Piscataway ,NJ, USA, IEEE, US, vol. 4,Oct. 6, 2003(Oct. 6, 2003) , pp. 2252-2256,XP010703009,.
Exam Report received in European Patent Application No. EP20910204.5 dated Oct. 28, 2024.

* cited by examiner

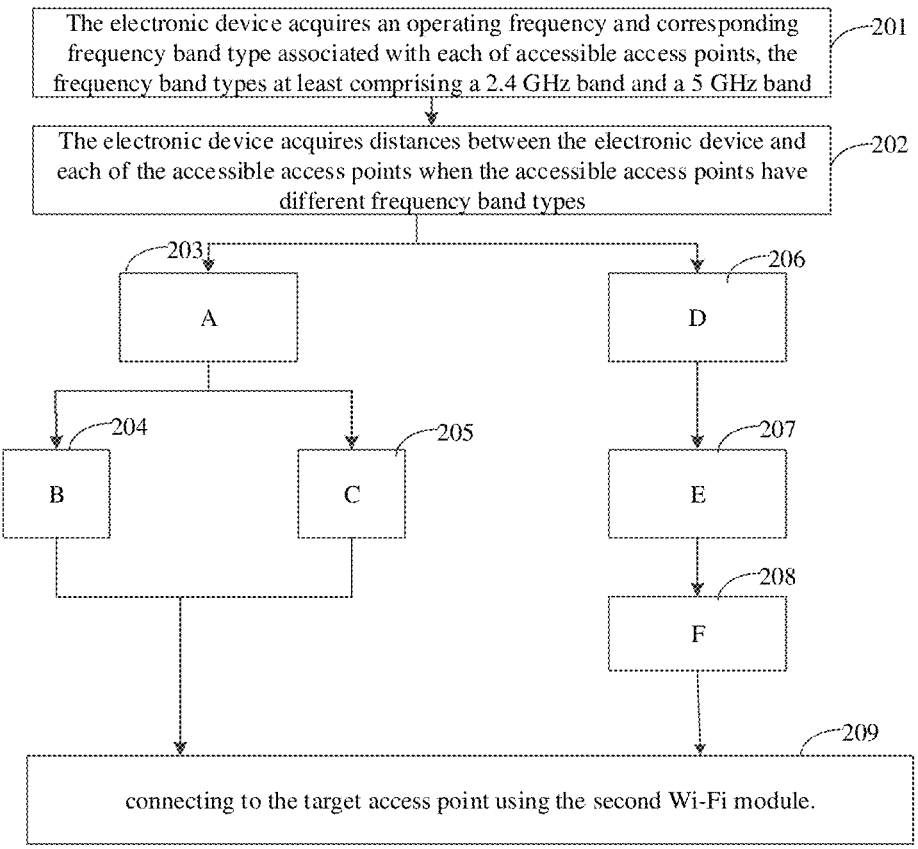

FIG. 2 if each of the distances is greater than or equal to the first preset distance threshold, the electronic device determines a first operating frequency corresponding to the first Wi-Fi network —203

Fig. 2a

If the first operating frequency belongs to a 5 GHz band, the electronic device determines a target access point from accessible access points, and the Wi-Fi network corresponding to the target access points operates on a 2.4 GHz band —204

Fig. 2b determining the target access point from the accessible access points if the first operating frequency belongs to a 2.4 GHz, wherein the Wi-Fi network corresponding to the target access point is operated on a 2.4 GHz band, and a target frequency interval is greater than any one of frequency intervals between the first operating frequency and operating frequencies of the remaining accessible access points other than the target accessible access point, and the target frequency interval is a frequency interval between the first operating frequency and a second operating frequency corresponding to the target access point /205

Fig. 2c acquiring a third operating frequency corresponding to an alternative access point, if there is the alternative access point amongst the accessible access points, a distance between the alternative access point and the electronic device being less than the first preset distance threshold /206

Fig. 2d acquiring a first operating frequency corresponding to the first Wi-Fi network /207

Fig. 2e determining the alternative access point as the target access point, if the frequency interval between the third operating frequency and the first operating frequency is greater than or equal to the preset interval threshold /208

Fig. 2f

DEVICE CONTROL METHOD, COMPUTER-READABLE STORAGE MEDIUM, AND ELECTRONIC DEVICE FOR DUAL Wi-Fi

CROSS-REFERENCE TO RELATED APPLICATIONS

The application is a continuation of International Application No. PCT/CN2020/138684, which was filed on Dec. 23, 2020 and claims priority to Chinese patent application No. 201911396274.6, which was filed on Dec. 30, 2019, titled "DEVICE CONTROL METHOD, APPARATUS, STORAGE MEDIUM AND ELECTRONIC DEVICE." The above applications are incorporated herein by reference in their entireties.

TECHNICAL FIELD

The disclosure relates to Wi-Fi® technologies, and particularly, to a device control method, an apparatus, a storage medium and an electronic device.

BACKGROUND

Wi-Fi® technologies refer to a type of wireless communication technology that currently, is widely-used. In accordance with some Wi-Fi® technologies, an electronic device may use dual-Wi-Fi® technology to simultaneously connect to two Wi-Fi® networks, e.g., for surfing the Internet. With dual-Wi-Fi® technology, the electronic device may benefit from higher network speed and larger actual throughput.

SUMMARY

Embodiments of the disclosure provide a device control method, an apparatus, a storage medium and an electronic device that allow for improved selection of a Wi-Fi® network for a Wi-Fi® module of an electronic device.

In a first aspect, an electronic device may be controlled with a device control method. The electronic device includes a first Wi-Fi® module and a second Wi-Fi® module. The electronic device may be connected to a first Wi-Fi® network using the first Wi-Fi® module. In accordance with the device control method, an operating frequency and corresponding frequency band type associated with each of accessible access points, the frequency band types at least including a 2.4 GHz band and a 5 GHz band; acquiring distances between the electronic device and the accessible access points when the accessible access points have different frequency band types;
  determining a target access point according to the distances and the operating frequencies of the accessible access points; and
  connecting to the target access point using the second Wi-Fi® module.

In a second aspect, an embodiment of the disclosure provides an apparatus for controlling a device, applied to an electronic device. The electronic device includes a first Wi-Fi® module and a second Wi-Fi® module. The electronic device is connected to the first Wi-Fi® network using the first Wi-Fi® module. The apparatus includes:
  a first acquisition module, configured to acquire an operating frequency and corresponding frequency band type associated with each of accessible access points, the frequency band types at least including a 2.4 GHz band and a 5 GHz band;
  a second acquisition module, configured to acquire distances between the electronic device and the accessible access points when the accessible access points have different frequency band types;
  a determination module, configured to determine a target access point according to the distances and the operating frequencies of the accessible access points; and
  a connection module, configured to connect to the target access point using the second Wi-Fi® module.

In a third aspect, an embodiment of the disclosure provides a storage medium storing a computer program, when the computer program is executed by a computer, the computer is caused to perform a method for controlling a device provided in this disclosure.

In a forth aspect, an embodiment of the disclosure provides an electronic device including at least one storage and at least one processor, when the at least one processor is configured to call a computer program stored in the at least one storage to perform a method for controlling a device provided in this disclosure.

BRIEF DESCRIPTION OF THE DRAWINGS

For ease of understanding technical schemes of the disclosure and beneficial effects thereof, detailed embodiments of the disclosure are described by referring to the appended drawings.

FIG. 2 is another flowchart of a device control method according to another embodiment of the disclosure.

FIG. 2a shows the operation A mentioned in FIG. 2.
FIG. 2b shows the operation B mentioned in FIG. 2.
FIG. 2c shows the operation C mentioned in FIG. 2.
FIG. 2d shows the operation D mentioned in FIG. 2.
FIG. 2e shows the operation E mentioned in FIG. 2.
FIG. 2f shows the operation F mentioned in FIG. 2.

DETAILED DESCRIPTION OF PREFERRED EMBODIMENTS

Figure 1:
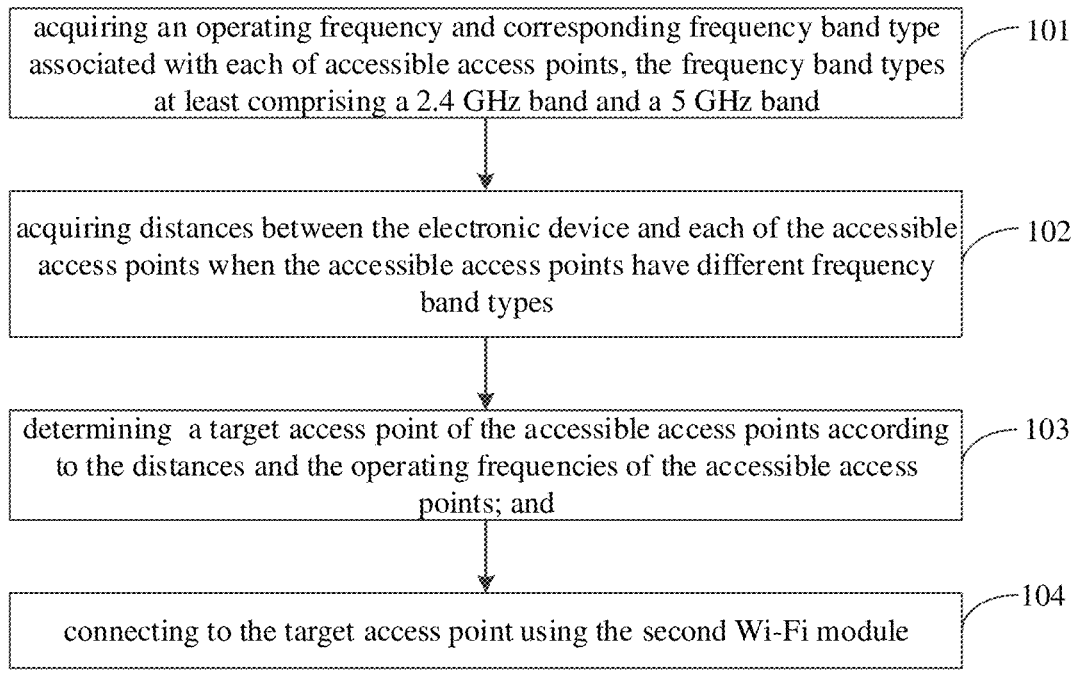
FIG. 1 is a flowchart of a device control method according to an embodiment of the disclosure.

As shown in the appended drawings, the identical symbols of components denote that the components are identical. Principles of the disclosure are described the context of various, non-limiting example scenarios.

An embodiment of the disclosure provides a device control method, applied to an electronic device. The electronic device includes a first Wi-Fi® module and a second Wi-Fi® module, and the electronic device is connected to a first Wi-Fi® network using the first Wi-Fi® module. The method includes acquiring an operating frequency and corresponding frequency band type associated with each of accessible access points. In some embodiments, the frequency band types include, e.g., at least a 2.4 GHz band and a 5 GHz band. The device control method further comprises acquiring distances between the electronic device and the accessible access points when the accessible access points have different frequency band types. Further still, the device control method comprising determining a target access point according to the distances and the operating frequencies of the accessible access points. Thereafter, the electronic device may connect to the target access point using the second Wi-Fi® module, described in greater detail below.

In an embodiment of the disclosure, the determining a target access point according to the distances and the accessible access points may include determining the target access point from the accessible access points if each of the distances is greater than or equal to a first preset distance threshold, wherein a Wi-Fi® network corresponding to the target access point is operated on a 2.4 GHz band.

In an embodiment of the disclosure, the determining the target access point from the accessible access points if each of the distances is greater than or equal to a first preset distance threshold wherein a Wi-Fi® network corresponding to the target access point is operated on a 2.4 GHz band, includes:
  determining a first operating frequency corresponding to the first Wi-Fi® network if each of the distances is greater than or equal to the first preset distance threshold, and
  determining the target access point from the accessible access points if the first operating frequency belongs to a 5 GHz band, wherein the Wi-Fi® network corresponding to the target access point is operated on a 2.4 GHz band.

In an embodiment of the disclosure, the method further includes:
  determining the target access point from the accessible access points if the first operating frequency belongs to a 2.4 GHz band, wherein the Wi-Fi® network corresponding to the target access point is operated on a 2.4 GHz band, and a target frequency interval is greater than any one of frequency interval between the first operating frequency and operating frequencies of the remaining accessible access points other than the target accessible access point, and the target frequency interval is a frequency interval between the first operating frequency and a second operating frequency corresponding to the target access point.

In an embodiment of the disclosure, the determining a target access point according to the distances and the operating frequencies of the accessible access points, includes:
  acquiring a third operating frequency corresponding to an alternative access point if there is the alternative access point amongst the accessible access points, a distance between the alternative access point and the electronic device being less than the first preset distance threshold;
  acquiring a first operating frequency corresponding to the first Wi-Fi® network; and
  determining the alternative access point as the target access point if a frequency interval between the third operating frequency and the first operating frequency is greater than or equal to a preset interval threshold.

In an embodiment of the disclosure, the method further includes:
  acquiring a strength value of a signal received from the alternative access point;
  wherein the determining the alternative access point as the target access point if a frequency interval between the third operating frequency and the first operating frequency is greater than or equal to a preset interval threshold, includes:
    determining the alternative access point as the target access point, if the frequency interval between the third operating frequency and the first operating frequency is greater than or equal to the preset interval threshold and the strength value of the signal received from the alternative access point is greater than or equal to a preset strength threshold.

In an embodiment of the disclosure, the acquiring distances between the electronic device and the accessible access points, includes:
  acquiring strength values of Wi-Fi® signals received from Wi-Fi® networks corresponding to the accessible access points, and
  determining, according to the strength values, the distances between the electronic device and the accessible access points.

It can be understood that embodiments of the disclosure may be realized via/performed by an electronic device, such as, but not limited to, a smart cellphone, a tablet computer, and other like device. FIG. 1 is a flowchart illustrating operations that may be performed to effectuate a device control method according to an embodiment of the disclosure. The device control method may be applied to an electronic device. The electronic device may include a first Wi-Fi® module and a second Wi-Fi® module. In some embodiments, the electronic device may already be connected to a first Wi-Fi® network using the first Wi-Fi® module. At operation 101, an operating frequency and corresponding frequency band type associated with each of accessible access points is acquired, the frequency band types including at least a 2.4 GHz band and a 5 GHz band.

Wi-Fi® technologies are currently widely-used wireless communication technologies. In related technologies, an electronic device may use dual-Wi-Fi® technology to simultaneously connect to two Wi-Fi® networks for surfing the Internet. With dual-Wi-Fi® technology, the electronic device may get a higher network speed and a larger actual throughput. However, in conventional implementations, a Wi-Fi® module of an electronic device has limited flexibility to choose a Wi-Fi® network. For an example, when using dual-Wi-Fi® technology, an electronic device may randomly select a Wi-Fi® network to establish connection.

Therefore, in accordance with an embodiment of the disclosure, when an electronic device needs to connect to another Wi-Fi® network via a second Wi-Fi® module, the electronic device may acquire an operating frequency and corresponding frequency band type associated with each accessible access point. The frequency band types include a 2.4 GHz band and a 5 GHz band. That is, the electronic device may first acquire the operating frequency of each accessible access point. The electronic device may then determine on which one of a 2.4 GHz band and a 5 GHz band each of the accessible access points operates, i.e., the electronic device determines what band the operating frequency belongs to.

After acquiring the frequency band type associated with the operating frequency of each accessible access point, the electronic device may detect whether the accessible access points operate over different frequency band types. Namely, the electronic device may detect which some of the accessible access points operate on a 2.4 GHz band, and which some operate on a 5 GHz band.

If it is detected that all of the accessible access points operates on the same frequency band, for example, either the 2.4 GHz or 5 GHz, the electronic device may perform implementations else.

If it is detected that the accessible access points operate over different frequency band types, for example, some of the accessible access points operate on the 2.4 GHz band while some operate on the 5 GHz band, The device control method progresses to operation 102. At operation 102, the electronic device acquires distances between the electronic device and each of the accessible access points if the accessible access points operate with different frequency band types.

For example, if the electronic device detects that the accessible access points operate over different frequency band types, for example, some of the accessible access points operate on the 2.4 GHz band while some operate on the 5 GHz band. In this scenario, the electronic device may acquire distances between the electronic device and the accessible access points.

At operation 103, a target access point is determined according to the distances and the operating frequencies of the accessible access points determined at operation 102. At operation 104, the electronic device may connect to the determined, target access point using the electronic device's second Wi-Fi® module, thereby achieving dual Wi-Fi® functionality.

For example, 103 and 104 may include:
after acquiring distances between the electronic device and the accessible access points, the electronic device may determine a target access point according to the distances and the operating frequencies of the accessible access points, and connect to the target access point using the second Wi-Fi® module, and thus the dual-Wi-Fi® functionality is achieved.

For example, the electronic device may have already been connected to a first Wi-Fi® network using its first Wi-Fi® module. When the electronic device needs to enable dual-Wi-Fi® functionality, the electronic device may first acquire an operating frequency and corresponding frequency band type associated with each of accessible access points (as previously described). Namely, the electronic device may first determine on which one of a 2.4 GHz band and a 5 GHz band each of the accessible access points operates. For example, in one example scenario, the current accessible access points may include three access points A, B, C.

The electronic device may detect whether the accessible access points operate on the same frequency band. For example, the electronic device detects that the access points A and B operate on the 2.4 GHz band, while access point C operates on the 5 GHz band. That is, at least two of the accessible access points operate on different frequency bands. In this scenario, the electronic device may acquire respective distances between the electronic device and each of the three accessible access points A, B, C.

The electronic device may, according to the distances (namely, d1 (distance to access point A), d2 (distance to access point B), d3 (distance to access point C)) and the operating frequencies of the accessible access points, determine a target access point, and then connect to the target access point using the second Wi-Fi® module. For example, the electronic device may determine that the access point A is the target access point. The electronic device may connect to target access point A using a second Wi-Fi® module. The Wi-Fi® network over which the access point A operates (using the detected operating frequency within either the 2.4 GHz or 5 GHz band, for example) is considered a second Wi-Fi® network, thereby achieving the dual-Wi-Fi® functionality in the electronic device. It should be understood that by virtue of making the aforementioned determinations selection of a Wi-Fi® network need no longer be a random determination. It can be understood that, in embodiments of the disclosure, when the accessible access points have different frequency band types, the electronic may determine a target access point according to the distances between the electronic device and the accessible access points and the operating frequencies of the accessible access points, and then connect to the target access point using a second Wi-Fi® module. Therefore, compared with a technical scheme for randomly selecting a Wi-Fi® network, embodiments of the disclosure can improve the flexibility of an electronic device in selecting a Wi-Fi® network for a Wi-Fi® module of the electronic device.

FIG. 2 is another flowchart of a device control method provided in embodiments of the disclosure. In order not to make FIG. 2 be crowed, the operations A, B, C, D, E and F are respectively shown in FIG. 2a, FIG. 2b, FIG. 2c, FIG. 2d, FIG. 2e and FIG. 2f. The device control method can be applied to an electronic device. The electronic device may include a first Wi-Fi® module and a second Wi-Fi® module. The electronic device has already been connected to a first Wi-Fi® network using a first Wi-Fi® module. The procedures of the device controlling method may include:

201. Acquiring an operating frequency and corresponding frequency band type associated with each of accessible access points, the frequency band types at least including a 2.4 GHz band and a 5 GHz band.

For example, when an electronic device needs to connect to another Wi-Fi® network via a second Wi-Fi® module, the electronic device may firstly acquire an operating frequency and corresponding frequency band type associated with each of accessible access points in the current circumstance. The frequency band types include a 2.4 GHz band and a 5 GHz band. That is, in the embodiment of the disclosure, the electronic device may firstly acquire the operating frequency of each of the accessible access points, and then determine on which one of a 2.4 GHz band and a 5 GHz band each of the accessible access points operates.

After acquiring corresponding frequency band type associated with the operating frequency of each of the accessible access points, the electronic device may detect whether the accessible access points have different frequency band types. Namely, the electronic device may detect whether some of the accessible access points operates on the 2.4 GHz band while some operates on the 5 GHz band.

If it is detected that all of the accessible access points operates on a same frequency band, for example, a same 2.4 GHz band or a same 5 GHz band, the electronic device may perform implementations else. For example, the terminal device may determine an access point which has the least interference with a first Wi-Fi® network from the accessible access points as a target access point, and connect to the target access point using a second Wi-Fi® module. Optionally, the terminal device may determine an access point which has the strongest signal strength amongst the accessible access point as the target access point, and connect to the target access point using a second Wi-Fi® module.

If it is detected that when the accessible access points have different frequency band types, for example, some of the accessible access points operate on the 2.4 GHz band and some operate on the 5 GHz band, and then the step 202 may be started.

202. If the accessible access points have different frequency band types, the electronic may determine distances between the electronic device and the accessible access points.

For example, the electronic device detects that some of the current accessible access points operate on the 2.4 GHz band while some operate on the 5 GHz band. In this scenario, the electronic may acquire distances between the electronic device and the accessible access points.

In one embodiment, the electronic device may acquire the distances between the electronic device and the accessible access points by acquiring strength values of Wi-Fi® signals received from Wi-Fi® networks on which the accessible access points operate. The electronic device may determine, the distances between the electronic device and the accessible access points based on the corresponding Wi-Fi® signal strength value associated with the accessible access points. That is, there is a correlation between signal strength and distance, e.g., typically, the closer the electronic device may be to an accessible access point, the stronger the Wi-Fi® signal strength value that is associated with signals received by the electronic device from the accessible access point.

For example, an electronic device manufacture may determine, in advance, the distances between the accessible access points corresponding to different signal strength values, and obtain a mapping table showing correspondences between the Wi-Fi® signal strength values and the distances. After acquiring strength values of Wi-Fi® signals corresponding to the accessible access points, the electronic device may determine, according to the mapping table and the strength values, the distances between the electronic device and the accessible access points.

In other embodiments, the electronic device may determine the distances between the accessible access points and the electronic device by an approach as follows: For example, the electronic device may transmit sounding data packages to the accessible access points, and the accessible access points receive the sounding data packages and transmit them back to the electronic device. The electronic device may count time intervals between the time when the sounding data packages were transmitted and received back at the electronic device. Distance between an accessible access point and the electronic device can be calculated based on the time intervals.

After determining distances between the electronic device and the accessible access points, the electronic may detect whether each of the distances is greater than or equal to a first preset distance threshold.

If it is detected that each of the distances is greater than or equal to the first preset distance threshold, the electronic device may perform operation 203. That is, if each of the distances is greater than or equal to the first preset distance threshold, the electronic device will determine a first operating frequency corresponding to the first Wi-Fi® network.

For example, if the electronic device detects that each of distances between all the accessible access points in current circumstances and the electronic device is greater than or equal to the first preset distance threshold, it denotes that all the distances are too large. In this scenario, the electronic device may determine a target access points from the accessible access points, and the target access point corresponds to a Wi-Fi® network operated on a 2.4 GHz band.

For example, the electronic device may acquire a first operating frequency corresponding to the first Wi-Fi® network, and detect that to which one of a 2.4 GHz band and a 5 GHz band the first operating frequency corresponding to the first Wi-Fi® network belongs.

If the first operating frequency corresponding to the first Wi-Fi® network belongs to a 5 GHz band, the step 204 will be started.

If the first operating frequency corresponding to the first Wi-Fi® network belongs to a 2.4 GHz band, the step 205 will be started.

204. If the first operating frequency belongs to a 5 GHz band, the electronic device will determine a target access point from accessible access points, and the Wi-Fi® network corresponding to the target access points operates on a 2.4 GHz band.

For example, if the electronic device detects that distances between all the accessible access points and the electronic device are too large, the first operating frequency corresponding to the first Wi-Fi® network connecting to the first Wi-Fi® module of the electronic device belongs to a 5 GHz band, in this scenario, the electronic device may determine an access point amongst the accessible access points which operates on a 2.4 GHz band as the target access point, and connect to the target access point using the second Wi-Fi® module, and thus the dual-Wi-Fi® functionality will be achieved. For an example, the electronic device may randomly select any one of the accessible access points which operates on a 2.4 GHz band as the target access point.

That is, the first Wi-Fi® module connects to an access point operating on a 5 GHz band, and the second Wi-Fi® module connects to an access point operating on a 2.4 GHz band.

It should be understood that when signal strength values associated with accessible access points are low (which as previously described correlates to long distances between the electronic device and an accessible access point), embodiments effectuate electronic device control such that an alternative frequency band type associated with other accessible access points are preferably selected for use. That alternative frequency band type is associated with determined signal strengths (and corresponding distances) that are stronger and hence associated with accessible access points that are closer to the electronic device. For example, if in a scenario, signal operating on a 2.4 GHz band has stronger penetrating power, and distances between all the accessible access points and the electronic device are too large, the embodiment of the disclosure can ensure the strength of the Wi-Fi® signal corresponding to the second Wi-Fi® network by selecting an access point whose operating channel belongs to a 2.4 GHz band for the second Wi-Fi® module.

205. If the first operating frequency belongs to a 2.4 GHz band, the electronic device determines the target access point from the accessible access points, and the Wi-Fi® network corresponding to the target access point is operated on a 2.4 GHz band, and a target frequency interval is greater than frequency intervals between the first operating frequency and the remaining accessible access points other than the target accessible access point, and the target frequency interval is a frequency interval between the first operating frequency and a second operating frequency corresponding to the target access point.

For example, if the electronic device detects that distances between all the accessible access points and the electronic device are too large, the first operating frequency corresponding to the first Wi-Fi® network connecting to the first Wi-Fi® module of the electronic device belongs to a 2.4 GHz band. In this scenario, the electronic device may determine a target access point from the accessible access points, and a Wi-Fi® network corresponding to the target access point is operated on 2.4 GHz, and a target frequency interval is greater than frequency intervals between the first operating frequency and the remaining accessible access points other than the target accessible access point, and the target frequency interval is a frequency interval between the first operating frequency and a second operating frequency corresponding to the target access point. That is, the target access point is an access point, which is amongst the current accessible access points, and operates on a 2.4 GHz band and has the least interference with the first Wi-Fi® network.

It can be understood that, in embodiments of the disclosure, if distances between all the current accessible access points and the electronic device are too large, the second Wi-Fi® network to be connected to the second Wi-Fi® module of the electronic device will be determined as a network corresponding to the access point operating on a 2.4 GHz band. Since the signal operating on a 2.4 GHz band has a stronger penetrating power, the embodiment of the disclosure can ensure the strength of the Wi-Fi® signal corresponding to the second Wi-Fi® network by selecting an access point whose operating channel belongs to a 2.4 GHz band for the second Wi-Fi® module.

If it is detected that not all of the distances are greater than or equal to the first preset distance threshold, the step 206 is started.

206. If there is an alternative access point amongst the accessible access points, the electronic device acquires a third operating frequency corresponding to the alternative access point, and a distance between the alternative access point and the electronic device is less than the first preset distance threshold.

207. The electronic device acquires a first operating frequency corresponding to the first Wi-Fi® network.

208. If a frequency interval between the third operating frequency and the first operating frequency is greater than or equal to a preset interval threshold, the electronic device determines the alternative access point as the target access point.

For example, the steps 206, 207, 208 may include: The electronic detects that not all the distances between the current accessible access points and the electronic device are greater than or equal to the first preset distance threshold. For example, the electronic detects that there is an alternative access point amongst the current accessible access points, and the distance between the alternative access point and the electronic device is less than the first preset distance threshold. That is, there is an access point which is close enough to the electronic amongst the current accessible access points. In this scenario, the electronic device may acquire a third operating frequency corresponding to the alternative access point.

The electronic device may acquire the first operating frequency of the first Wi-Fi® network corresponding to the first Wi-Fi® module, and determines whether the frequency interval between the third operating frequency band and the first operating frequency is greater than or equal to a preset interval threshold.

If the determined frequency interval between the third operating frequency band and the first operating frequency is greater than or equal to a preset interval threshold, the electronic device may determine the alternative access point as the target access point, and connect the second Wi-Fi® module to the target access point, and then the dual-Wi-Fi® functionality is realized.

In an embodiment of the disclosure, the electronic device may acquire a strength value of a signal received from the alternative access point. If a frequency interval between the third operating frequency and the first operating frequency is greater than or equal to a preset interval threshold, the electronic device determines the alternative access point as the target access point. That is, the target access point chosen by the electronic device for the second Wi-Fi® module is not only closed to the electronic but also has a great value in signal strength.

In some other embodiments of the disclosure, if a frequency interval between the third operating frequency and the first operating frequency is less than a preset interval threshold, that is, an alternative access point amongst the accessible access points is close to the electronic device, but a frequency interval between the third operating frequency corresponding to the alternative access point and the first operating frequency corresponding to the first Wi-Fi® network currently connected to the electronic device is too small, which denotes that there is a great interference between the operating frequency of the alternative access point and that of the first Wi-Fi® network. In such a scenario, the electronic device may select, from other accessible points, an access point whose operating frequency has an interference less than a preset value with the first operating frequency corresponding to the first Wi-Fi® network, as the target access point.

209. The electronic device connects to the target access point using the second Wi-Fi® module.

For example, after the target access point is determined, the electronic device may connect to the target access point using the second Wi-Fi® module, and then realize the dual-Wi-Fi® functionality.

Figure 3:
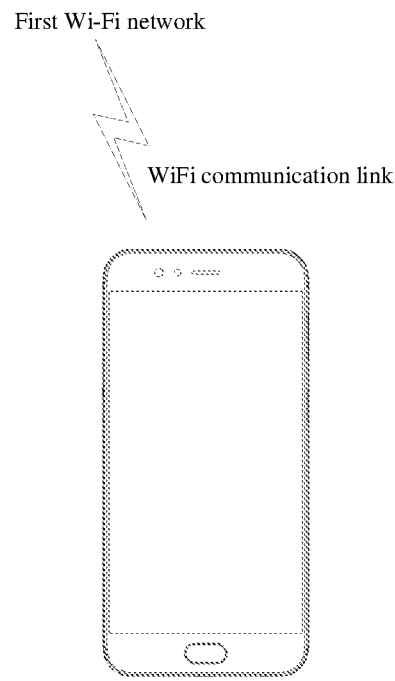
FIG. 3 is diagram illustrating a scenario in which an embodiment of the disclosure is applied.
Figure 4:
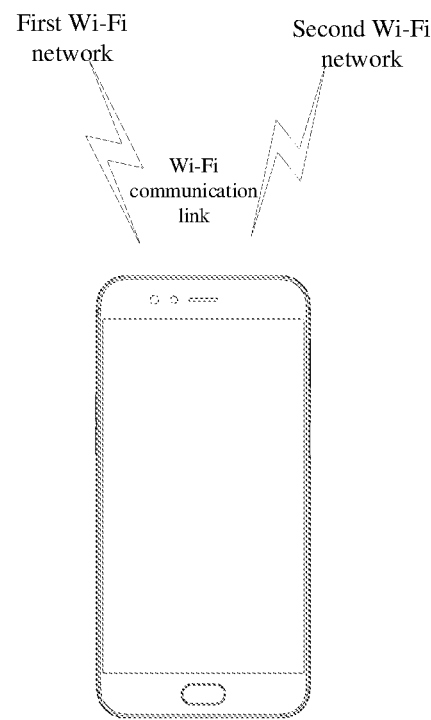
FIG. 4 is another diagram illustrating a scenario in which the embodiment illustrated in FIG. 3 is applied.

FIG. 3 and FIG. 4 are diagrams illustrating example in which embodiments of the disclosure may be applied.

For example, as shown in FIG. 3, the electronic device has already been connected to the first Wi-Fi® network using the Wi-Fi® module. The first Wi-Fi® network may be called a primary Wi-Fi® network. After a period of time, the electronic detects a need to enable the dual-Wi-Fi® functionality. That is, the electronic device needs to connect to another Wi-Fi® network using its second Wi-Fi® module.

In this scenario, the electronic device may first acquire the operating frequency and corresponding frequency band type associated with each of the accessible access points. The frequency band types include a 2.4 GHz band and a 5 GHz band. That is, in the embodiment of the disclosure, the electronic device may firstly acquire an operating frequency of each of the accessible access points, and then determine on which of a 2.4 GHz band and a 5 GHz band each of the accessible access points operates. For example, the electronic determines that the current accessible access points include A, B, C, D, E and F, and the Wi-Fi® networks corresponding to access points A, B, C and D operate on the 2.4 GHz band, and the Wi-Fi® networks corresponding to access points E and F operate on the 5 GHz band.

When the accessible access points have different band types, the electronic device may determine distances between the accessible access points and the electronic device based on signal strength values of signals received from the accessible access points.

The electronic device may determine whether each of distances between the accessible access points and the electronic device is greater than or equal to a first preset distance threshold.

If each of the distances is greater than or equal to a first preset distance threshold, the electronic device determines a first operating frequency corresponding to the first Wi-Fi® network. That is, if all the distances are too large, the electronic device may acquire a first operating frequency corresponding to the first Wi-Fi® network.

If the first operating frequency belongs to a 5 GHz band, the electronic device may determine an access point which operates on a 2.4 GHz band and has a largest signal strength amongst the access points as the target access point. For example, the Wi-Fi® networks corresponding to access points A, B, C and D operate on the 2.4 GHz band, and the Wi-Fi® signal received by the electronic device from the access point has a largest value, resulting in the electronic device determining access point A as the target access point. Thus, the dual-Wi-Fi® network of the electronic device includes a primary Wi-Fi® network operating on the 5 GHz band and a secondary Wi-Fi® network operating on the 2.4 GHz band.

If the first operating frequency band belongs to a 2.4 GHz band, the electronic device may determine an access point which provides a Wi-Fi® network having the least interference with the primary Wi-Fi® network amongst the Wi-Fi® networks corresponding to the current accessible access points as the target access point. Upon connecting to the target access point using the second Wi-Fi® module, and then the electronic device is connected to a second Wi-Fi® network. That is, both the first and second Wi-Fi® networks operate in a 2.4 GHz band.

If each of the distances between the current access points and the electronic device is less than a preset distance threshold, for example, the distances between the electronic device and the access points are less than a preset first distance threshold. The electronic device may determine the access points D and E as the alternative access points.

The electronic device may acquire Wi-Fi® network operating frequencies respectively corresponding to the access points D and E. The electronic device may acquire a first operating frequency corresponding to the first Wi-Fi® network.

The electronic device may determine whether a frequency interval between the first operating frequency and an operating frequency of the Wi-Fi® network corresponding to the access point D is greater than or equal to the preset interval threshold. The electronic device may then determine whether a frequency interval between the first operating frequency and an operating frequency of the Wi-Fi® network corresponding to the access point E is greater than or equal to the preset interval threshold. For example, if the frequency interval between the first operating frequency and an operating frequency of the Wi-Fi® network corresponding to the access point D is greater than the preset interval threshold, and the frequency interval between the first operating frequency and an operating frequency of the Wi-Fi® network corresponding to the access point E is less than the preset interval threshold. In this scenario, the electronic device may determine the access point D as the target access point, and connect to the target access point using the second Wi-Fi® module.

After determining the target access point, the electronic device may connect to the target access point using the second Wi-Fi® module, and thus the electronic connects to the secondary Wi-Fi® network, as shown in FIG. 4.

Figure 5:
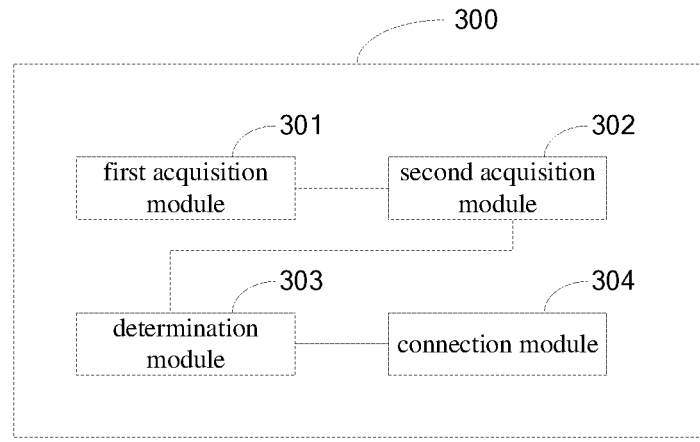
FIG. 5 is an example architecture illustrating components for controlling a device according to an embodiment of the disclosure.

FIG. 5 is a schematic representation of an apparatus for controlling a device according to an embodiment of the disclosure. The apparatus for controlling a device may be applied to an electronic device. The electronic device includes a first Wi-Fi® module and a second Wi-Fi® module. The electronic device may connect to the first Wi-Fi® network using the first Wi-Fi® module. The apparatus for controlling a device may include: a first acquisition module 301, a second acquisition module 302, a determination module 303 and a connection module 304.

The first acquisition module 301 is configured to acquire an operating frequency and corresponding frequency band type associated with each of accessible access points, the frequency band types at least including a 2.4 GHz band and a 5 GHz band.

The second acquisition module 302 is configured to acquire distances between the electronic device and the accessible access points if the accessible access points have different frequency band types.

The determination module 303 is configured to determine a target access point according to the distances and the operating frequencies of the accessible access points.

The connection module 304 is configured to connect to the target access point using the second Wi-Fi® module.

In an embodiment, the determination module 303 may be configured to determine the target access point from the accessible access points if each of the distances is greater than or equal to a first preset distance threshold, and a Wi-Fi® network corresponding to the target access point is operated on 2.4 GHz band.

In an embodiment, the determination module 303 is configured to determine a first operating frequency corresponding to the first Wi-Fi® network if each of the distances is greater than or equal to the first preset distance threshold, and configured to determine the target access point from the accessible access points if the first operating frequency belongs to a 5 GHz band, and the Wi-Fi® network corresponding to the target access point is operated on a 2.4 GHz band.

In an embodiment, the determination module 303 is configured to determine the target access point from the accessible access points if the first operating frequency belongs to 2.4 GHz band, and the Wi-Fi® network corresponding to the target access point is operated on 2.4 GHz band, and a target frequency interval is greater than frequency intervals between the first operating frequency and the remaining accessible access points other than the target accessible access point, and the target frequency interval is a frequency interval between the first operating frequency and a second operating frequency corresponding to the target access point.

In an embodiment, the determination module 303 is configured to: acquire a third operating frequency corresponding to an alternative access point if there is the alternative access point amongst the accessible access points, a distance between the alternative access point and the electronic device being less than the first preset distance threshold; acquire a first operating frequency corresponding to the first Wi-Fi® network; and determine the alternative access point as the target access point if a frequency interval between the third operating frequency and the first operating frequency is greater than or equal to a preset interval threshold.

In an embodiment, the determination module 303 is configured to: acquire a strength value of a signal received from the alternative access point; and determine an alternative access point as the target access point, if the frequency interval between the third operating frequency and the first operating frequency is greater than or equal to a preset interval threshold and the strength value of the signal received from the alternative access point is greater than or equal to a preset strength threshold.

In an embodiment, the second acquisition module 302 may be configured to acquire strength values of Wi-Fi® signals received from Wi-Fi® networks corresponding to the accessible access points, and determine, according to the strength values, the distances between the electronic device and the accessible access points.

An embodiment of the disclosure provides a computer-readable storage medium in which a computer program is stored, when the computer program is executed by a computer, the computer is caused to perform a device control method as described in embodiments of the disclosure.

An embodiment of the disclosure provides an electronic device, include at least one storage and at least one processor. The at least one processor is configured to call a computer program stored in the at least one storage to perform implementations of a device control method, as described in the embodiments of the disclosure.

Figure 6:
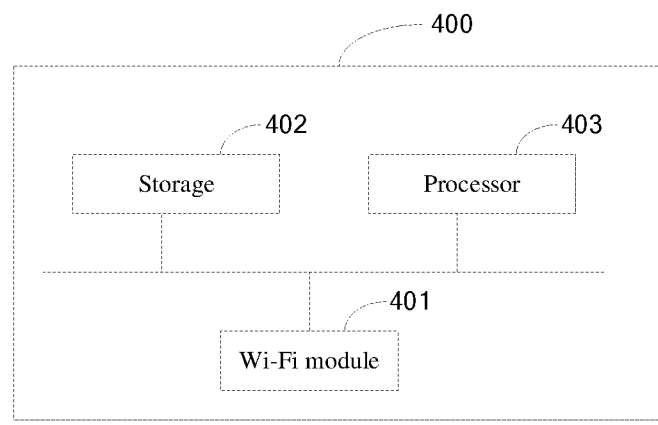
FIG. 6 is a schematic representation of an electronic device according to an embodiment of the disclosure.

For example, the aforementioned electronic device may be a mobile terminal, such as a tablet computer, a smart phone. FIG. 6 is a schematic representation of an electronic device according to an embodiment of the disclosure.

The electronic device may include at least one Wi-Fi® module 401, at least one storage 402, and at least one processor 403. Those skilled in the art would understand that structures of the electronic device as shown in FIG. 6 are non-limiting examples. Compared with the electronic device shown in FIG. 6, an electronic device may include less or more components, or include combinations of some components or include the components which are differently arranged.

The at least one Wi-Fi® module 401 may include a first Wi-Fi® module and a second Wi-Fi® module. The first Wi-Fi® module may include a first MAC address and a first Wi-Fi® antenna. The second Wi-Fi® module may include a second MAC address and a second Wi-Fi® antenna. The electronic device may connect to the first access point for connection with the first Wi-Fi® network using the first Wi-Fi® antenna based on the first MAC address. The electronic device may connect to the second access point for connection with the second Wi-Fi® network using the second Wi-Fi® antenna based on the second MAC address.

The storage 402 may configured to store application programs and data. The application programs stored in storage 402 include executable codes. The application programs may constitute various functional modules. The at least one processor 403 is configured to perform executing the various application programs and processing data.

The at least one processor 403 is the control center of the electronic device. Parts of the electronic devices are connected by using various interfaces and circuits. Various functionalities and data processing are performed by running or executing application programs stored in the at least one storage 402 and by calling data stored in the at least one storage 402, and thus the electronic device itself as a whole is monitored.

In an embodiment, the electronic device has already been connected to the first Wi-Fi® network using the first Wi-Fi® module. At least one processor 403 of the he electronic device loads executable codes corresponding to processes of application programs to the at least one storage 402 and runs the application programs stored in storage 402 to perform operations. For example, the electronic device acquires an operating frequency and corresponding frequency band type associated with each of accessible access points, the frequency band types including at least a 2.4 GHz band and a 5 GHz band. The electronic device acquires distances between the electronic device and the accessible access points if the accessible access points have different frequency band types, determines a target access point according to the distances and the operating frequencies of the accessible access points. Thereafter, the electronic device may connect to the target access point using the second Wi-Fi® module.

Figure 7:
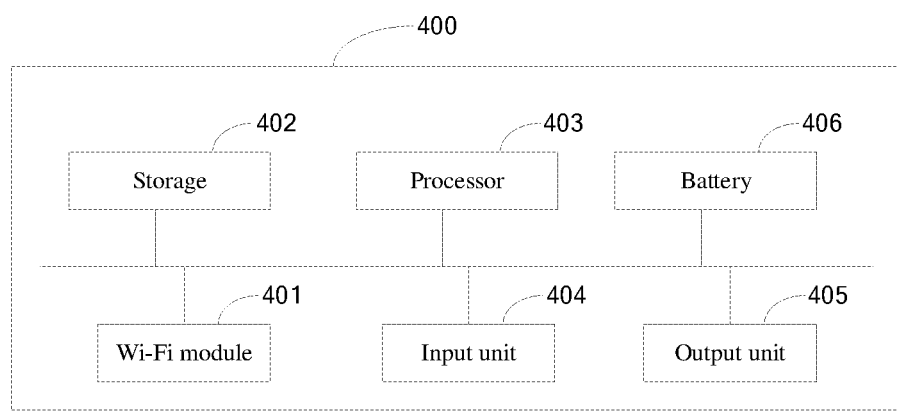
FIG. 7 is another schematic representation of an electronic device according to an embodiment of the disclosure.

Referring to FIG. 7, the electronic device 400 may include at least one Wi-Fi® module 401, at least one storage 402, at least one processor 403, at least one input unit 404, at least one output unit 405 and at least one battery 406.

The at least one Wi-Fi® module 401 may include a first Wi-Fi® module and a second Wi-Fi® module. The first Wi-Fi® module may include a first MAC address and a first Wi-Fi® antenna. The second Wi-Fi® module may include a second MAC address and a second Wi-Fi® antenna. The electronic device may connect to the first access point for connection with the first Wi-Fi® network using the first Wi-Fi® antenna based on the first MAC address. The electronic device may connect to the second access point for connection with the second Wi-Fi® network using the second Wi-Fi® antenna based on the second MAC address.

The at least one storage 402 may be configured to store application programs and data. The at least one processor 403 performs various functional applications and data processing by running the application programs stored in the at least one storage 402.

The at least one processor 403 is the control center of the electronic device. Parts of the electronic devices are connected by using various interfaces and circuits. Various functionalities and date processing are performed by running or executing application programs stored in the at least one storage 402 and by calling data stored in the at least one storage 402, and thus the electronic device itself as a whole is monitored.

The at least one input unit 404 may be configured to receive the inputted figures, character information or user characteristic information (for example, fingerprint information), and to receive inputs related to user's settings, and to receive inputs related to functionalities of a keyboard, a mouse, an operating bar, an optical ball or trackball.

The at least one output unit 405 may be configured to display information inputted by a user or information providing with a user, and display graphical user interfaces. The graphical user interfaces may be composed of diagrams, texts, icons, videos, or any combination thereof. The at least one output unit may include a display panel.

The battery may be configured to provide electric power for various components of the electronic device.

In an embodiment, the electronic device has already been connected to the first Wi-Fi® network using the first Wi-Fi® module. At least one processor 403 of the he electronic device loads executable codes corresponding to processes of application programs to the at least one storage 402 and runs the application programs stored in storage 402 to perform:
  acquiring an operating frequency and corresponding frequency band type associated with each of accessible access points, the frequency band types at least including a 2.4 GHz band and a 5 GHz band;
  acquiring distances between the electronic device and the accessible access points if the accessible access points have different frequency band types;
  determining a target access point according to the distances and the operating frequencies of the accessible access points; and
  connecting to the target access point using the second Wi-Fi® module.

In an embodiment, the determining, by the at least one processor 403, a target access point according to the distances and the accessible access points, includes:
  determining the target access point from the accessible access points if each of the distances is greater than or equal to a first preset distance threshold, and a Wi-Fi® network corresponding to the target access point is operated on 2.4 GHz band.

In an embodiment, the determining, by the at least one processor 403, the target access point from the accessible access points if each of the distances is greater than or equal to a first preset distance threshold, wherein a Wi-Fi® network corresponding to the target access point is operated on 2.4 GHz band, includes:

determining a first operating frequency corresponding to the first Wi-Fi® network if each of the distances is greater than or equal to the first preset distance threshold, and determining the target access point from the accessible access points if the first operating frequency belongs to a 5 GHz band, wherein the Wi-Fi® network corresponding to the target access point is operated on a 2.4 GHz band.

In an embodiment, the at least one processor 403 is further configured to determine the target access point from the accessible access points if the first operating frequency belongs to the 2.4 GHz band, and the Wi-Fi® network corresponding to the target access point is operated on the 2.4 GHz band, and a target frequency interval is greater than frequency intervals between the first operating frequency and the remaining accessible access points other than the target accessible access point, and the target frequency interval is a frequency interval between the first operating frequency and a second operating frequency corresponding to the target access point.

In an embodiment, the determining, by the at least one processor 403, a target access point according to the distances and the operating frequencies of the accessible access points, includes: acquiring a third operating frequency corresponding to an alternative access point if there is the alternative access point amongst the accessible access points, a distance between the alternative access point and the electronic device being less than the first preset distance threshold; acquiring a first operating frequency corresponding to the first Wi-Fi® network; and determining the alternative access point as the target access point if a frequency interval between the third operating frequency and the first operating frequency is greater than or equal to a preset interval threshold.

In an embodiment, the at least one processor 403 is further configured to acquire a strength value of a signal received from the alternative access point.

the determining, by the at least one processor 403, the alternative access point as the target access point if a frequency interval between the third operating frequency and the first operating frequency is greater than or equal to a preset interval threshold, includes:

determining the alternative access point as the target access point, if the frequency interval between the third operating frequency and the first operating frequency is greater than or equal to a preset interval threshold and the strength value of the signal received from the alternative access point is greater than or equal to a preset strength threshold.

In an embodiment, the acquiring, by the at least one processor 403, distances between the electronic device and the accessible access points, includes:

acquiring strength values of Wi-Fi® signals received from Wi-Fi® networks and corresponding to the accessible access points, and determining, according to the strength values, the distances between the electronic device and the accessible access points.

In the aforementioned embodiments, descriptions of the embodiments are respectively highlighted, and some contents that are not detailed in certain embodiment may be obtained by referring to the detailed description of the device control method mentioned above, and the contents are not repeated herein.

The apparatus for controlling a device provided in the embodiments of the disclosure is of the same conception as the device control method mentioned in the above embodiments, and any of the methods provided in embodiments of the device control method can be run on the apparatus for controlling a device, and the specific implementation process is detailed in the embodiments of the device control method and will not be repeated herein.

It is noted that, for the device control method described in embodiments of the disclosure, it can be understood by a person those skilled in the art that all or part of the process for implementing the method described in the embodiments of the disclosure can be accomplished by controlling the relevant hardware using a computer program. The computer program may be stored in a computer-readable storage medium, such as in a memory, and executed by at least one processor. The implementation of execution of the computer program may include a process as described in embodiments of the device control method. The storage medium may be a magnetic disk, a CD, a read only memory (ROM, Read Only Memory), a random access memory (RAM, Random Access Memory), etc.

For an apparatus for controlling a device provided in the embodiments of the disclosure, functional modules of the apparatus can be integrated in a processing chip, or physically and separately exist in the apparatus, and two or more modules of the apparatus can be integrated in a single module. The integrated module can be implemented either in a form of hardware or in a form of software functional module. If implemented in a form of software functional module, the integrated module may sold or used as an stand-alone product, and may also be stored in a computer-readable storage medium, such as a read-only memory, a magnetic disk or a CD, etc.

A device control method, an apparatus, a storage medium and an electronic device are detailed in the above embodiments of the disclosure. Specific examples applied in the context are to illustrate the principles and implementation of the disclosure. The above embodiments are only used to help understand the method and its core conception of the method, and thus, for those skilled in the art, according to the conception of the disclosure, specific implementations and application scopes of the disclosure can be varied in certain aspects. In summary, the contents of this specification should not be understood as a limitation of the disclosure.

What is claimed is:

1. A device control method, applied to an electronic device, wherein the electronic device comprises a first Wi-Fi module and a second Wi-Fi module, and the device control method comprises:

detecting that the electronic device is in a state in which the electronic device is being connected to a first Wi-Fi network using the first Wi-Fi module;

in response to a request of connecting to a second Wi-Fi network using the second Wi-Fi module, acquiring an operating frequency and corresponding frequency band type associated with each of accessible access points for the second Wi-Fi module while the electronic device is connected to the first Wi-Fi network, the frequency band types at least comprising a 2.4 GHz band and a 5 GHz band;

in response to determining that the accessible access points for the second Wi-Fi module have different frequency band types, acquiring distances between the electronic device and the accessible access points for the second Wi-Fi module, and determining a target access point of the accessible access points for the second Wi-Fi module according to the distances, the operating frequencies of the accessible access points for the second Wi-Fi module, and a first operating frequency corresponding to the first Wi-Fi network; and enabling a dual Wi-Fi function, by connecting to the target access point using the second Wi-Fi module while the electronic device is connected to the first Wi-Fi network using the first Wi-Fi module.

2. The method as claimed in claim 1, wherein the determining a target access point for the second Wi-Fi module according to the distances, the accessible access points for the second Wi-Fi module, and the first operating frequency corresponding to the first Wi-Fi network, comprises:

determining the target access point from the accessible access points for the second Wi-Fi module according to the accessible access points, and the first operating frequency corresponding to the first Wi-Fi network, in response to determining that each of the distances is greater than or equal to a first preset distance threshold, wherein a Wi-Fi network corresponding to the target access point is operated on a 2.4 GHz band.

3. The method as claimed in claim 2, wherein the determining of the target access point from the accessible access points for the second Wi-Fi module according to the accessible access points, and the first operating frequency corresponding to the first Wi-Fi network, comprises:

determining the first operating frequency corresponding to the first Wi-Fi network, and determining, as the target access point, any one operating on a 2.4 GHz band from the accessible access points for the second Wi-Fi module, in response to determining that the first operating frequency belongs to a 5 GHz band.

4. The method as claimed in claim 3, wherein the determining of the target access point from the accessible access points for the second Wi-Fi module according to the accessible access points, and the first operating frequency corresponding to the first Wi-Fi network, further comprises:

determining, as the target access point, one selected from the accessible access points for the second Wi-Fi module, in response to determining that the first operating frequency belongs to a 2.4 GHz band, wherein the selected one accessible access point is operated on a 2.4 GHz band, and a target frequency interval is greater than any one of frequency intervals between the first operating frequency and operating frequencies of remaining accessible access points for the second Wi-Fi module other than the selected accessible access point, and the target frequency interval is a frequency interval between the first operating frequency and a second operating frequency corresponding to the selected accessible access point.

5. The method as claimed in claim 1, wherein the determining a target access point according to the distances, the operating frequencies of the accessible access points for the second Wi-Fi module, and the first operating frequency corresponding to the first Wi-Fi network, comprises:

acquiring a third operating frequency corresponding to an alternative access point for the second Wi-Fi module, in response to determining that there is the alternative access point amongst the accessible access points for the second Wi-Fi module, and a distance between the alternative access point for the second Wi-Fi module and the electronic device is less than a first preset distance threshold;

acquiring the first operating frequency corresponding to the first Wi-Fi network; and determining the alternative access point as the target access point, in response to determining that a frequency interval between the third operating frequency and the first operating frequency is greater than or equal to a preset interval threshold.

6. The method as claimed in claim 5, the method further comprises:

acquiring a strength value of a signal received from the alternative access point;

wherein the determining the alternative access point as the target access point in response to determining that a frequency interval between the third operating frequency and the first operating frequency is greater than or equal to a preset interval threshold, comprises:

determining the alternative access point as the target access point, in response to determining that the frequency interval between the third operating frequency and the first operating frequency is greater than or equal to the preset interval threshold and the strength value of the signal received from the alternative access point is greater than or equal to a preset strength threshold.

7. The method as claimed in claim 1, wherein the acquiring distances between the electronic device and the accessible access points for the second Wi-Fi module, comprises:

acquiring strength values of Wi-Fi signals received from Wi-Fi networks corresponding to the accessible access points for the second Wi-Fi module, and determining, according to the strength values of the Wi-Fi signals received from the Wi-Fi networks corresponding to the accessible access points for the second Wi-Fi module, the distances between the electronic device and the accessible access points for the second Wi-Fi module.

8. A non-transitory computer-readable storage medium in which a computer program is stored, when the computer program is executed by a processor of an electronic device, the processor is caused to perform a method, the method comprising:

detecting that the electronic device is in a state in which the electronic device is being connected to a first Wi-Fi network using a first Wi-Fi module of the electronic device;

in response to a request of connecting to a second Wi-Fi network using a second Wi-Fi module of the electronic device, acquiring an operating frequency and corresponding frequency band type associated with each of accessible access points for the second Wi-Fi module while the electronic device is connected to the first Wi-Fi network, the frequency band types at least comprising a 2.4 GHz band and a 5 GHz band;

in response to determining that the accessible access points for the second Wi-Fi module have different frequency band types, acquiring distances between an electronic device and the accessible access points for the second Wi-Fi module, and determining a target access point of the accessible access points for the second Wi-Fi module according to the distances and the operating frequencies of the accessible access points for the second Wi-Fi module, and a first operating frequency corresponding to the first Wi-Fi network; and enabling a dual Wi-Fi function, by connecting to the target access point using the second Wi-Fi module while the electronic device is connected to the first Wi-Fi network using the first Wi-Fi module.

9. An electronic device, comprising at least one storage and at least one processor, wherein the at least one processor is configured to call a computer program stored in the at least one storage to:
   detect that the electronic device is in a state in which the electronic device is being connected to a first Wi-Fi network using a first Wi-Fi module of the electronic device;
   in response to a request of connecting to a second Wi-Fi network using a second Wi-Fi module of the electronic device, acquire an operating frequency and corresponding frequency band type associated with each of accessible access points for the second Wi-Fi module while the electronic device is connected to the first Wi-Fi network, the frequency band types comprising a 2.4 GHz band and a 5 GHz band;
   in response to determining that the accessible access points for the second Wi-Fi module have different frequency band types, acquire distances between the electronic device and the accessible access points for the second Wi-Fi module, and determine a target access point for the second Wi-Fi module according to the distances, the operating frequencies of the accessible access points for the second Wi-Fi module, and a first operating frequency corresponding to the first Wi-Fi network; and
   enable a dual Wi-Fi function, by connecting to the target access point using the second Wi-Fi module while the electronic device is connected to the first Wi-Fi network using the first Wi-Fi module.

10. The electronic device of claim 9, wherein the at least one processor is configured to:
    determine the target access point from the accessible access points for the second Wi-Fi module according to the accessible access points, and the first operating frequency corresponding to the first Wi-Fi network, in response to determining that each of the distances is greater than or equal to a first preset distance threshold, wherein a Wi-Fi network corresponding to the target access point is operated on a 2.4 GHz band.

11. The electronic device of claim 10, wherein the at least one processor is configured to:
    determine the first operating frequency corresponding to the first Wi-Fi network, in response to determining that each of the distances is greater than or equal to the first preset distance threshold, and
    determine, as the target access point, any one operating on a 2.4 GHz band from the accessible access points for the second Wi-Fi module, in response to determining that the first operating frequency belongs to a 5 GHz band.

12. The electronic device of claim 11, wherein the processor is configured to:
    determine, as the target access point, one selected from the accessible access points for the second Wi-Fi module, in response to determining that the first operating frequency belongs to a 2.4 GHz band, wherein the selected one accessible access point is operated on a 2.4 GHz band, and a target frequency interval is greater than any one of frequency intervals between the first operating frequency and operating frequencies of remaining accessible access points for the second Wi-Fi module other than the selected accessible access point, and the target frequency interval is a frequency interval between the first operating frequency and a second operating frequency corresponding to the selected accessible access point.

13. The electronic device of claim 9, wherein the processor is configured to:
    acquire a third operating frequency corresponding to an alternative access point for the second Wi-Fi module, in response to determining that there is the alternative access point amongst the accessible access points for the second Wi-Fi module, and a distance between the alternative access point for the second Wi-Fi module and the electronic device is less than a first preset distance threshold;
    acquire the first operating frequency corresponding to the first Wi-Fi network; and
    determine the alternative access point as the target access point in response to determining that a frequency interval between the third operating frequency and the first operating frequency is greater than or equal to a preset interval threshold.

14. The non-transitory computer-readable storage medium as claimed in claim 8, wherein the determining a target access point for the second Wi-Fi module according to the distances, the accessible access points for the second Wi-Fi module, and the first operating frequency corresponding to the first Wi-Fi network, comprises:
    determining the target access point from the accessible access points for the second Wi-Fi module according to the accessible access points, and the first operating frequency corresponding to the first Wi-Fi network, in response to determining that each of the distances is greater than or equal to a first preset distance threshold, wherein a Wi-Fi network corresponding to the target access point is operated on a 2.4 GHz band.

15. The non-transitory computer-readable storage medium as claimed in claim 14, wherein the determining of the target access point from the accessible access points for the second Wi-Fi module according to the accessible access points, and the first operating frequency corresponding to the first Wi-Fi network, comprises:
    determining the first operating frequency corresponding to the first Wi-Fi network, and
    determining, as the target access point, any one operating on a 2.4 GHz band from the accessible access points for the second Wi-Fi module, in response to determining that the first operating frequency belongs to a 5 GHz band.

16. The non-transitory computer-readable storage medium as claimed in claim 15, wherein the determining of the target access point from the accessible access points for the second Wi-Fi module according to the accessible access points, and the first operating frequency corresponding to the first Wi-Fi network, further comprises:
    determining, as the target access point, one selected from the accessible access points for the second Wi-Fi module, in response to determining that the first operating frequency belongs to a 2.4 GHz band, wherein the selected one accessible access point is operated on a 2.4 GHz band, and a target frequency interval is greater than any one of frequency intervals between the first operating frequency and operating frequencies of remaining accessible access points for the second Wi-Fi module other than the selected accessible access point, and the target frequency interval is a frequency interval between the first operating frequency and a second operating frequency corresponding to the selected accessible access point.

17. The non-transitory computer-readable storage medium as claimed in claim 8, wherein the determining a target access point according to the distances, the operating frequencies of the accessible access points for the second Wi-Fi module, and the first operating frequency corresponding to the first Wi-Fi network, further comprises:
   acquiring a third operating frequency corresponding to an alternative access point for the second Wi-Fi module, in response to determining that there is the alternative access point amongst the accessible access points for the second Wi-Fi module, and a distance between the alternative access point for the second Wi-Fi module and the electronic device is less than a first preset distance threshold;
   acquiring the first operating frequency corresponding to the first Wi-Fi network; and
   determining the alternative access point as the target access point, in response to determining that a frequency interval between the third operating frequency and the first operating frequency is greater than or equal to a preset interval threshold.

18. The non-transitory computer-readable storage medium as claimed in claim 17, wherein the method further comprises:
   acquiring a strength value of a signal received from the alternative access point;
   wherein the determining the alternative access point as the target access point in response to determining that a frequency interval between the third operating frequency and the first operating frequency is greater than or equal to a preset interval threshold, comprises:
   determining the alternative access point as the target access point, in response to determining that the frequency interval between the third operating frequency and the first operating frequency is greater than or equal to the preset interval threshold and the strength value of the signal received from the alternative access point is greater than or equal to a preset strength threshold.

19. The non-transitory computer-readable storage medium as claimed in claim 8, wherein the acquiring distances between the electronic device and the accessible access points for the second Wi-Fi module, comprises:
   acquiring strength values of Wi-Fi signals received from Wi-Fi networks corresponding to the accessible access points for the second Wi-Fi module, and
   determining, according to the strength values of the Wi-Fi signals received from the Wi-Fi networks corresponding to the accessible access points for the second Wi-Fi module, the distances between the electronic device and the accessible access points for the second Wi-Fi module.

20. The method as claimed in claim 1, further comprising:
   in response to determining that the accessible access points for the second Wi-Fi module have a same frequency band type, determining, as the target access point, one of the accessible access points for the second Wi-Fi module that has the least interference with the first Wi-Fi network.

* * * * *